United States Patent [19]
Anton et al.

[11] Patent Number: 5,349,759
[45] Date of Patent: Sep. 27, 1994

[54] SLICING GUIDE MARKER

[75] Inventors: Joseph G. Anton, Brooklyn Park; Dale W. Frederickson, Lindstrom; Glenn O. Rasmussen, Champlin, all of Minn.

[73] Assignee: The Pillsbury Company, Minneapolis, Minn.

[21] Appl. No.: 78,709

[22] Filed: Jun. 16, 1993

[51] Int. Cl.⁵ .................... B43L 13/00; G01B 1/00
[52] U.S. Cl. .......................... 33/524; 33/32.1; 33/32.6; 426/76; 426/383; 83/932; 83/331; 83/669
[58] Field of Search ............. 33/524, 775, 778, 779, 33/32.1, 32.3, 32.4, 32.5, 32.6, 37, 38, 39.1; 426/87, 76, 383; 83/331, 332, 663, 669, 932

[56] References Cited

U.S. PATENT DOCUMENTS

| | | | |
|---|---|---|---|
| 1,952,698 | 3/1934 | Willem | 426/76 |
| 2,031,252 | 2/1936 | Criner | 426/76 |
| 2,159,997 | 5/1939 | Millar | 33/524 |
| 2,161,551 | 6/1939 | Nilsson | 33/38 |
| 2,175,214 | 10/1939 | Robinson et al. | 426/76 |
| 2,622,513 | 12/1952 | Rinehart et al. | 426/383 |
| 2,686,972 | 8/1954 | Sanford | 33/27 |
| 2,916,826 | 12/1959 | Bower et al. | 33/32.1 |
| 3,006,273 | 10/1961 | Sommer | 33/32.1 |
| 3,171,315 | 3/1965 | Jahn | 83/331 |
| 3,765,909 | 10/1973 | Moline | 426/383 |
| 5,049,399 | 9/1991 | Huang et al. | 426/87 |

Primary Examiner—Christopher W. Fulton
Attorney, Agent, or Firm—Fredrikson & Byron

[57] ABSTRACT

A slicing guide marker for marking impressionable food products with an elongated cantilever arm rotatably attached to a support shaft. The cantilever arm having a marking roller adjacent one end and a counterweight slidably carried by the arm. The marking roller having a wheel with a plurality of teeth extending generally radially outwardly of the wheel for marking the food product.

5 Claims, 3 Drawing Sheets

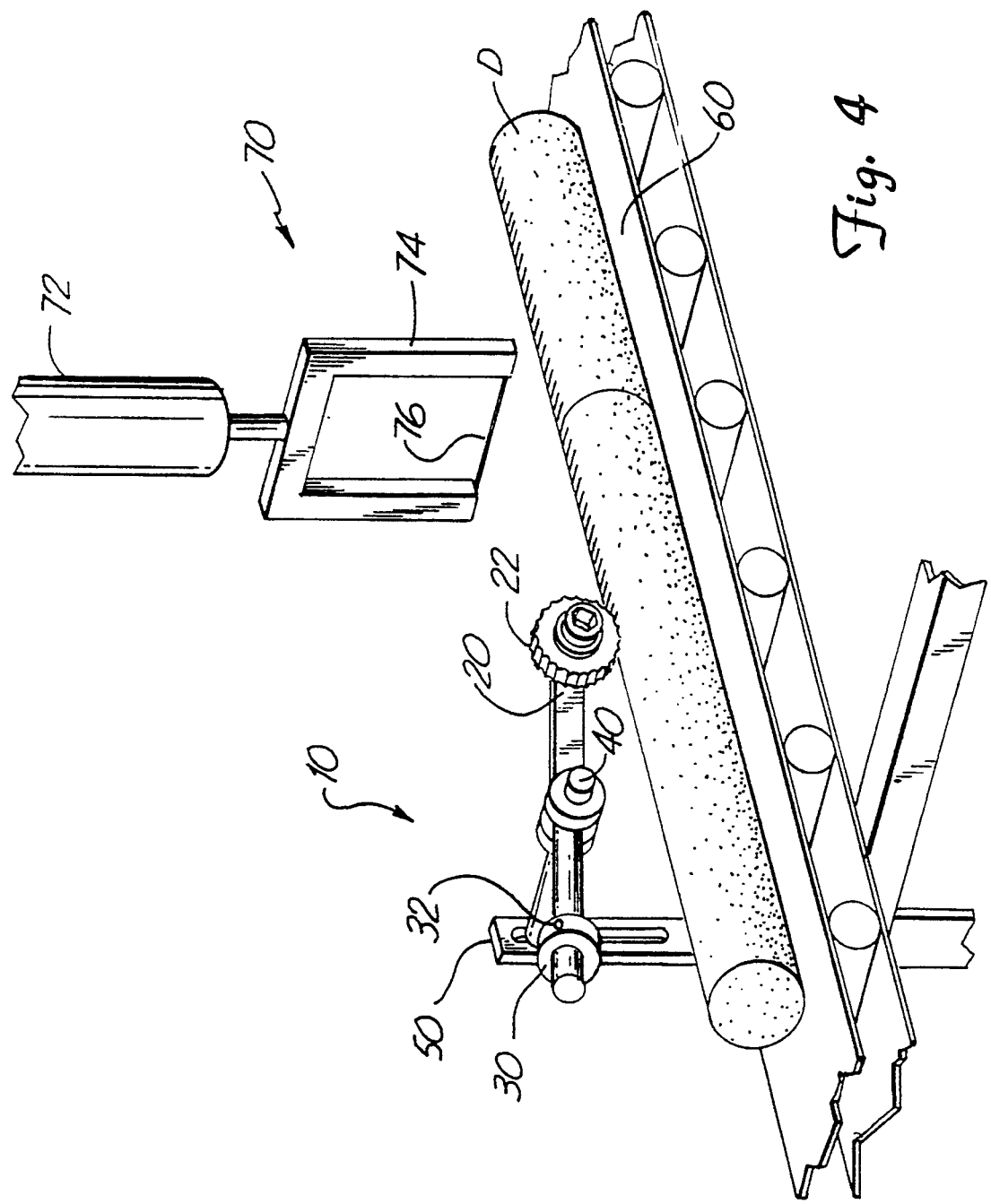

SLICING GUIDE MARKER

FIELD OF THE INVENTION

The present invention generally relates to mechanisms for marking impressionable food products with graduated markings and has particular utility in providing dough or other similar products with graduated markings for use as guides in slicing the product.

BACKGROUND OF THE INVENTION

A variety of impressionable food products are prepared and sold commercially. For instance, prepared doughs for cookies and the like are frequently sold to consumers so they can make "home made" baked goods quickly and easily. Such doughs are usually packaged for sale to consumers with a sufficient quantity in each package to prepare a "batch" of baked goods. To prepare the baked goods, a consumer need only open the package, divide the dough into individual portions (e.g. a quantity of dough for a single cookie) and bake the dough.

Depending on the nature of the baked goods, a single batch of the baked goods can include a dozen or more individual portions. For instance, commercially prepared cookie doughs will frequently be sold in packages containing sufficient dough to prepare as many as three dozen standard-size cookies. When the consumer is dividing the dough into individual portions before baking, it can be difficult to accurately gauge the mount of dough in a single individual portion. For instance, if a consumer is informed that a package of dough should be divided into 36 equal portions for baking three dozen cookies, it is virtually impossible for the consumer to accurately gauge one thirty-sixth of the dough. Accordingly, the size of one cookie can vary quite a bit from others in the same batch.

Some manufacturers sell their prepared doughs in a large, unshaped mass. For instance, the dough may be sold in a standard pint-sized container of the type used in the ice-cream industry. Such packages will usually tell the consumer the amount of dough to be used for each cookie, e.g. one tablespoon, and the consumer can measure out about the same amount of dough for each individual portion with a measuring device. Although this enables a careful consumer to make a relatively uniformly-sized batch of baked goods, the shape of the baked goods will be irregular. This method will generally only work for so-called "drop" cookies and the like.

Some manufacturers sell prepared doughs in elongate, generally tubular packages. This permits a consumer to slice the dough generally orthogonal to the axis of the generally cylindrical dough into a series of disk-shaped segments which have a relatively uniform round shape. This is particularly appealing in the case of cookie doughs as the resulting fiat, well rounded baked cookies are deemed to be visually more appealing than "drop" cookies. However, without the aid of a measuring device it can be quite difficult for a consumer to accurately subdivide a long cylinder of dough into the proper number of individual portions. Accordingly, the consumer will frequently end up with a batch of baked goods which are fairly uniformly shaped but can vary significantly in size.

Obviously, if a consumer were to subdivide a long cylinder of dough into accurately sized portions with a measuring device such as a tablespoon the advantageous round shape of the cylindrical dough would be lost. Some manufacturers have attempted to give the consumer some guidance in subdividing the dough into individual portions by placing evenly spaced hash marks on the exterior of the package, not unlike the hash marks appearing on sticks of butter.

This approach works well for butter because refrigerated butter tends to be relatively hard and can be sliced with a knife. Dough which is ready for baking tends to be softer (i.e. is more easily plastically deformed), though, and is not as readily sliced through the package as is butter. Instead of producing uniformly sized, well rounded portions of dough, slicing the dough through a marked plastic package will tend to deform the dough into irregular shapes and the dough will tend to flow during cutting, leading to different quantities of dough in different cookies.

Others have attempted to mark the dough itself, permitting consumers to remove the dough from the package and cut the dough along predefined hash marks. However, different types of dough tend to have noticeably different impressionabilities, i.e. some doughs are more readily marked through plastic deformation than others. For instance, doughs for sugar cookies tends to be more impressionable than doughs for peanut butter cookies.

When installing a marking device on a commercial production line, the same marking device could mark some doughs more readily than others. Thus, some of the less impressionable doughs may have barely perceptible markings while other, more impressionable doughs can have rather prominent gashes along their length.

Accordingly, it would be desirable to provide a means for reproducibly marking doughs with graduated hash marks for consumers to use as slicing guides. The marking device should be readily adjusted to account for variations in the impressionability of doughs from one type of dough to another, or one batch of dough to another.

SUMMARY OF THE INVENTION

The present invention provides a slicing guide marker which includes a marking roller for contacting the dough or other food product, the roller including a series of evenly spaced teeth extending radially outwardly for marking the dough. The marking roller is carried adjacent a first end of an elongate cantilever arm and the cantilever arm is rotatably attached to a generally horizontal shaft. A counterweight is desirably carried by the cantilever arm along a length of the arm disposed away from the marking roller and is adjustable along the length of the arm. By adjusting the relative distance between the counterweight and the shaft about which the arm pivots, the force which the marking roller exerts against a dough can be reproducibly controlled.

In accordance with a further embodiment of the invention, the slicing guide marker described above is positioned adjacent a conveying mechanism which moves the food product. Elongate, generally tubular lengths of dough may be carried along the conveyer and the marking roller can be brought into contact with the dough as it passes by the slicing guide marker to mark the dough.

The present invention also contemplates a method of marking various impressionable food products of varying impressionability with a series of relatively evenly spaced hash marks for guiding a consumer in cutting the food product, which may be a dough. In accordance with this method, a slicing guide marker generally as described above is positioned adjacent a conveyor along which the dough travels.

The impressionability of a food products is determined. The counterweight is then positioned along the cantilever arm at a location selected to yield a contact force between the marking roller and the food product correlated to the impressionability of the food product. Once the counterweight has been properly positioned, the food product may be passed along the conveyor and marked by the marking roller. The contact force between the roller and the dough or other food product is sufficient to provide marks of a predetermined depth in the dough.

In keeping with a further embodiment of the method of the invention, a second food product is provided and the impressionability of that food product is determined. The position of the counterweight along the cantilever arm is then adjusted to yield a contact force correlated to the impressionability of the second food product (which may be different from the first food product). The second food product is then passed along the conveyor and marked by the marking roller. The second force is sufficient to provide marks of approximately the same predetermined depth in the second food product as were provided in the first food product.

BRIEF DESCRIPTION OF THE DRAWINGS

FIG. 4 is a perspective elevational view of a slicing guide marker and a conveying system in accordance with the present invention.

DETAILED DESCRIPTION

Figure 1:
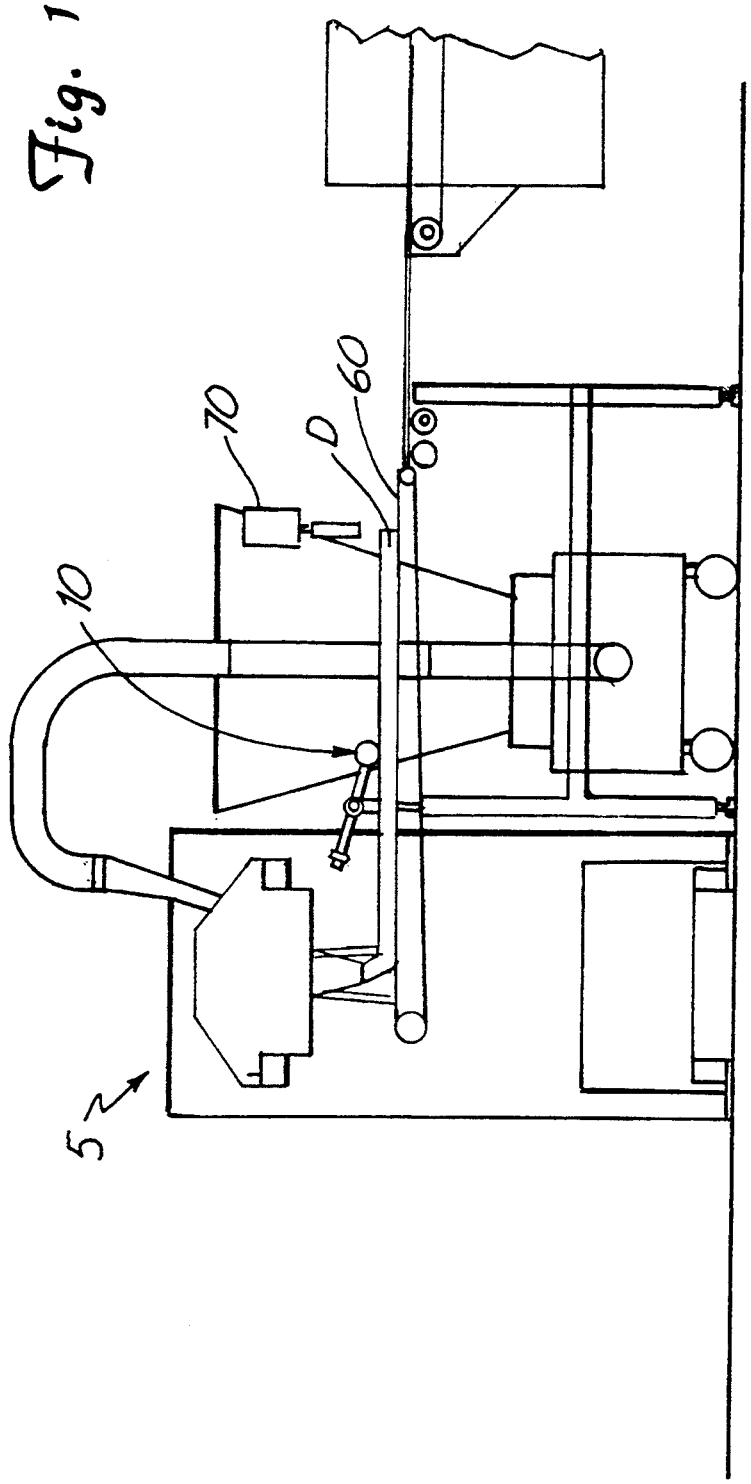
FIG. 1 is a schematic illustration of a slicing guide marker and dough conveying system of the invention.

FIGS. 1-4 illustrate one preferred embodiment of a slicing guide marker 10 in accordance with the present invention. As seen in FIG. 1, the slicing guide marker 10 is desirably positioned along a dough processing line which includes an extruder 5 for extruding a large batch of dough into a continuous robe or the like. The tube is then conveyed past the slicing guide marker 10 and is marked prior to further processing, such as freezing and packaging.

Figure 2:
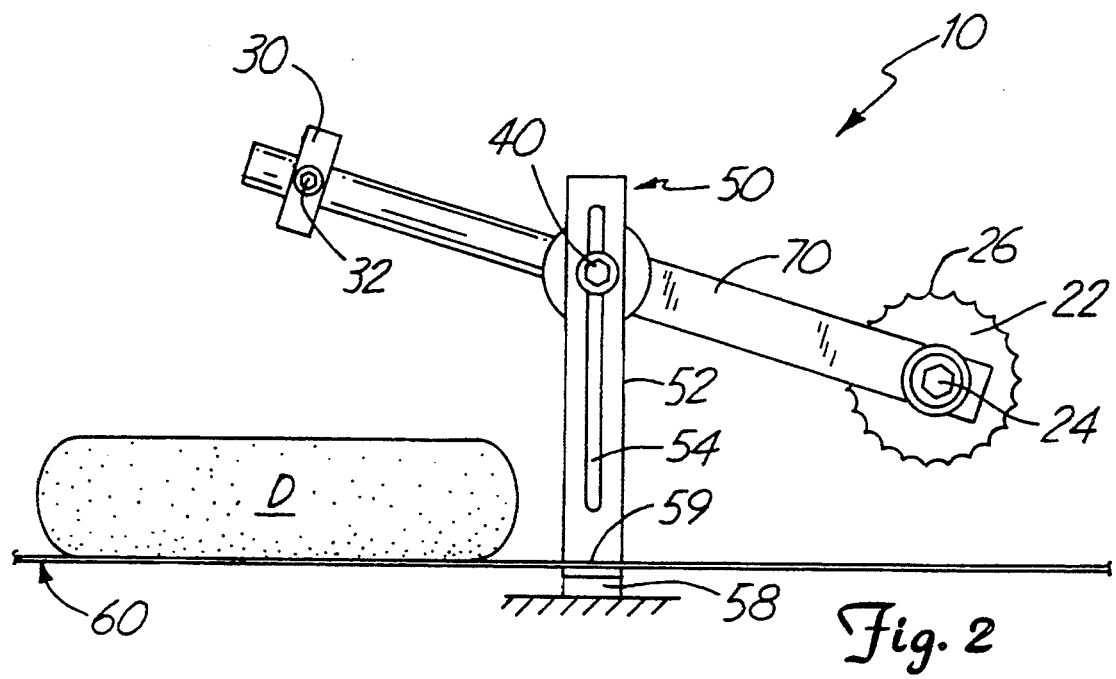
FIG. 2 is a side isolation view of the slicing guide marker of FIG. 1.
Figure 3:
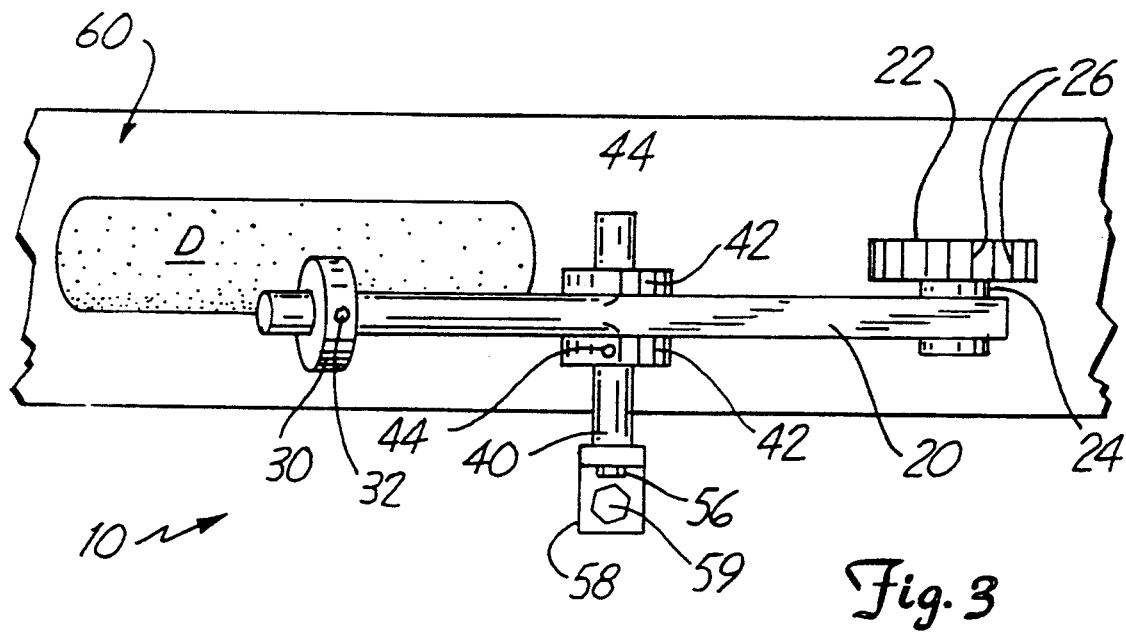
FIG. 3 is a top isolation view of the slicing guide marker of FIGS. 1 and 2 in contact with the dough.

As best seen in FIGS. 2-4, the slicing guide marker 10 includes an elongate cantilever arm 20 rotatably attached to a generally horizontal shaft 40 and a mounting bracket 50 for mounting the marker 10 adjacent a conveyor mechanism for impressionable food products.

The cantilever arm generally includes a marking roller 22 carried adjacent at one end of the arm and a counterweight 30 which is adjustable along the length of the cantilever arm. Although the cantilever arm may be of any desired shape, in one preferred embodiment it comprises a solid, elongate, generally cylindrical shaft having a smooth outer surface. Such a smooth, round shape will permit the counterweight to slide along the cantilever arm to adjust the force with which the marking roller contacts the dough, as described below.

A marking roller 22 is carried adjacent one end of the cantilever arm 20. The marking roller is attached to the cantilever arm in a manner which permits the marking roller to turn about an axis 24 with respect to the cantilever arm. In one preferred embodiment, the marking roller is generally horizontally oriented and turns in a plane which is substantially parallel to the axis of the cantilever arm. If so desired, bearings or the like may be included on the shaft 24 in order to permit the marking roller to freely rotate about that shaft.

The marking roller 22 includes a plurality of teeth 26 extending generally radially outwardly from the body of the roller. The teeth 26 are desirably substantially uniformly sized and spaced approximately equiangularly about the periphery of the roller 22. The teeth may be of any suitable size and shape for marking the dough with a series of hash marks, as detailed below. In the embodiment shown, the outer edges of the teeth define a series of substantially evenly spaced horizontal surfaces, with the circumferential spacing between the teeth being approximately the same width as the width of the dough or other food product necessary to define one individual portion.

The marking roller 22 should be made of a material which can safely be brought into contact with foods. Most metals and many food-grade plastics will suffice.

As noted above, the cantilever arm 20 also includes a counterweight 30. This counterweight 30 is carried by the cantilever arm 20 and is slidable along the length of the cantilever arm. In the embodiment shown, the counterweight is generally annular and includes a port (not shown) therethrough for receiving the cantilever arm. The port and the counterweight should be made large enough to allow the counterweight to slide freely along the cantilever arm without undue resistance. A locking screw 32 may be used to lock the counterweight 30 into a desired position along the length of the cantilever arm.

The counterweight may be positioned on the cantilever arm on either side of the shaft 40. As explained more fully below in connection with the method of the invention, the position of the counterweight along the cantilever arm determines the force with which the marking roller 22 contacts the dough D. In the embodiment shown, the greater the distance between the counterweight and the horizontal shaft 40, the less force the marking roller will apply to the dough. If the counterweight were instead on the other side of the shaft 40, the force with which the marking roller contacts the dough would increase as the distance between the shaft and the counterweight increases.

In both circumstances, the movement of the counterweight closer to the marking roller will move the center of gravity of the cantilever arm assembly (the arm 20, marking roller 22 and counterweight 30) farther away from the shaft 40 and closer to the marking roller. This, in turn will increase the force with which the marking roller contacts the dough. Hence, regardless of which side of the shaft 40 the counterweight is disposed, the force with which the marking roller contacts the dough can be adjusted as a function of the distance between the counterweight and the marking roller.

As mentioned above, the slicing guide marker 10 includes a generally horizontally oriented shaft 40 about which the cantilever arm 20 turns. This shaft may be of any suitable shape and the connection between the shaft and the cantilever arm can be of any desired type that will permit the cantilever arm to rotate relatively freely with respect to the shaft. In the embodiment shown, the cantilever arm 20 includes a port (not shown) therethrough for receiving the generally horizontal shaft 40. The port in the cantilever arm should be large enough to permit the arm to rotate with respect to the shaft 40 without undue frictional resistance.

In order to prevent the cantilever arm from moving laterally, i.e., generally axially along the shaft 40, a pair of stops 42 can be provided on the shaft. In the embodiment of FIGS. 1-4, the stops 42 are generally annular rings locked into position on the shaft 40. The stops may be permanently affixed to the shaft so that the position of the cantilever arm 20 with respect to the shaft remains fixed. However, in one preferred embodiment, the stops 42 include locking screws 44 for locking the stops into place. If the lateral position of the cantilever arm 20 needs to be adjusted, these locking screws can be loosened to permit the cantilever arm to slide axially along the shaft 40. Once the cantilever arm is moved to a new position, the stops may once again be locked in place with the locking screws 44.

The horizontal shaft 40 is affixed to a mounting bracket 50. In one preferred embodiment, the mounting bracket comprises a generally L-shaped metal bracket having an elongate, generally vertically extending leg 52 and a generally horizontal mounting leg 58. The horizontal shaft 40 may be attached to the vertical leg of the mounting bracket while the horizontal mounting leg is affixed to a conveying mechanism 60, which may comprise a conveyer belt mechanism or the like. The horizontal mounting leg 58 may be attached to the conveying mechanism 60 by any suitable means, such as by welding or by means of a bolt 59, as illustrated.

The vertical position of the horizontal shaft 40 may be made adjustable by allowing the position of the horizontal shaft along the vertical leg 52 of the mounting bracket 50 to be varied. In the embodiment shown, the vertical leg includes an elongate slot 54 extending vertically along much of its length. A suitable fastener 56, such as a bolt which passes through the slot 54 and is received within a threaded opening of the shaft 40, can be used to fix the vertical position of the horizontal shaft during use.

By simply loosening the fastener and moving the horizontal shaft 40 up or down, the vertical position of the shaft and the can never arm with respect to the conveying mechanism 60 can be adjusted. This, in combination with the adjustable stops 42 on the horizontal shaft, permits the position of the cantilever arm with respect to the conveyor 60 to be readily adjusted both vertically and horizontally to accommodate differences in the size of the portions of the dough D or other food product from one batch to the next.

In the embodiment schematically illustrated in FIGS. 1 and 4, a dough cutter 70 is positioned downstream of the slicing guide marker 10. The dough cutter may be of any style commonly available for use in cutting dough into segments. For instance, in the embodiment shown, the dough cutter comprises a vertical actuator, which may be a common air cylinder, for moving a slicer 74 vertically upwardly and downwardly. The slicer 74 may include a relatively thin wire 76 which actually cuts through the dough to divide an elongate length of dough, such as may be produced with a dough extruder, into a series of discrete dough portions which can be packaged for sale to consumers. If so desired, the dough cutter 70 could instead be positioned upstream of the marker 10 so that a series of discrete, precut segments of dough are brought into contact with the marker individually rather than as a single process batch of dough.

As best seen in FIG. 4, the slicing guide marker 10 of the invention may be used to mark an impressionable food product, such as the dough D shown in that figure, with a plurality of generally evenly-spaced hash marks. These hash marks are produced by contact between the marking roller 22 of the slicing guide marker and the food product as the food product is conveyed along a path adjacent the slicing guide marker. The size and shape of the hash marks is determined by the size and shape of the teeth 26 on the marking roller, with the depth of the hash marks being correlated with the impressionability of the food product and the force with which the marking roller contacts the food product.

In accordance with one embodiment of a method of the invention, a slicing guide marker 10 substantially described above is provided adjacent a conveyer mechanism 60 adapted to transport a dough or other impressionable food product along a path adjacent the marker 10. Before the food product D is brought into contact with the marker 10, the impressionability of that food product is determined. As used herein, impressionability is a measure of the ease with which a food product is marked by the marking roller. A food product which yield hash marks of a predetermined depth at a lower contact force with the marking roller 22 can be said to be more impressionable than a food product which requires greater force to achieve hash marks of the same predetermined depth.

Once the impressionability of the food product is determined, the position of the counterweight 30 along the cantilever arm 20 can be adjusted. The position of the counterweight along the cantilever arm should be selected to yield a contact force between the marking roller and the food product D correlated to the impressionability of that food product. As a general rule, the more impressionable the dough, the greater the distance between the counterweight and the marking roller. In the embodiment illustrated in FIGS. 1-4, the counterweight should be positioned closer to the shaft 40 for a less impressionable food product as this will shift the center of gravity of the cantilever arm closer to the marking roller 22. This shift in the center of gravity further away from the shaft 40 will increase the moment arm generated by the cantilever arm, leading to a more forceful contact between the marking roller and the dough.

If so desired, the cantilever arm may be graduated with a series of spaced-apart marks which correlate the position of the counterweight to the impressionability of the food product. In this manner, once the impressionability of a given food product has been determined, the counterweight can simply be moved along the cantilever arm to the corresponding graduation mark on the arm. In commercial production situations wherein the impressionability of a food product of a given composition will be relatively consistent, the cantilever arm 20 can be graduated with markings corresponding to different compositions of food products, which in turn constitutes a correlation to the impressionability of the food product. For example, in case of the manufacture of doughs it has been determined that a contact force between the marking roller 22 and a dough for sugar cookies is notably less than that contact force necessary to yield hash marks of the same predetermined depth in a dough for peanut butter cookies.

Once the impressionability of the food product has been determined and the position of the counterweight along the cantilever arm has been adjusted to produce a contact force between the marking roller and the food composition correlated to the impressionability of that food product, the food product can be passed adjacent the slicing guide marker 10. In the embodiment schematically illustrated in FIG. 1, a continuous length of a dough which has been extruded from a batch of dough by known means is placed on a conveyor mechanism 60.

This conveyor mechanism (best seen in FIGS. 1 and 4), which may be a common conveyor belt, conveys the dough along a path adjacent the slicing guide marker. In one preferred embodiment (not shown), the conveyor belt has a generally arcuate cross section to center the generally cylindrical extruded dough on the conveyor belt to ensure that the marker 10 contacts the dough in approximately the same location along the entire length of the extruded dough.

As the dough proceeds past the marker 10, it will contact the marking roller 22. The teeth 26 of the marking roller will press into the impressionable dough to a predetermined depth. Friction between the dough and the marking roller will cause the marking roller to turn about its axis 24 as the dough is conveyed along its path. As the marking roller rolls along the surface of the dough, the generally equiangularly spaced teeth 26 will generate a plurality of generally evenly-spaced hash marks along an upper surface of the dough, as schematically depicted in FIG. 4.

Either before or after the food product has been marked it can be cut into segments of a size suitable for individual sale to consumers. In the embodiment shown in FIGS. 1 and 4, the very long extruded segment of dough D is cut into smaller portions by the dough cutter 70 after it has been marked.

The general method as outlined above can be repeated to mark a second food product having an impressionability different from that of the first food product. For example, in the case of doughs the first food product may be a dough for sugar cookies while the second food product may be a dough for peanut butter cookies. After the first food product has been marked, the impressionability of the second food product can be determined and the position of the counterweight along the cantilever arm can be adjusted to generate a contact force between the marking roller and the food product correlated to the impressionability of the second food product.

This second food product can then be passed adjacent the slicing guide marker so that the marking roller 22 can mark the second food product with a plurality of generally evenly-spaced hash marks along an upper surface of that food product. This process can be repeated indefinitely for any of a number of different food products, such as a variety of different dough compositions having different impressionabilities.

As noted above, the slicing guide marker 10 of the invention is adjustable both horizontally and vertically with respect to the conveying mechanism 60. Although it is currently contemplated that the slicing guide marker 10 will be used in a standardized commercial production facility which makes a food product of only a single size, if the size of the food product is changed, this adjustability of the slicing guide marker can permit the horizontal or vertical position of the slicing guide marker to accommodate these differences in the food product.

The apparatus and method of the invention yield a food product which has a plurality of evenly-spaced hash marks along its length. As noted above, it can be difficult for a consumer to accurately judge the proper length of an elongate segment of dough to cut to yield one individual portion of the dough, such as the amount of dough to form one cookie. Dough or other food products marked in accordance with the present invention, though, will give the consumer a very simple guide for slicing the food product into a series of uniformly sized and shaped portions.

Thus, in another further embodiment of the invention, dough or other food product is marked in accordance with the method outlined above. The dough may then be packaged and shipped to consumers, if so desired. The present method further comprises slicing the food product along the hash marks provided by the marker 10 into a series of individual portions. If so desired, the individual portions of food may then be further processed, such as by baking the individual portions of a dough to yield cookies or other baked products.

While a preferred embodiment of the present invention has been described, it should be understood that various changes, adaptations and modifications may be made therein without departing from the spirit of the invention and the scope of the appended claims.

What is claimed is:

1. A slicing guide marker for marking an impressionable food product comprising an elongate cantilever arm rotatably attached to a support shaft, the cantilever arm having a marking roller adjacent one end thereof and a counterweight slidably carried by the arm, the marking roller comprising a wheel having a plurality of teeth extending generally radially outwardly of the wheel for marking the food product.

2. The invention of claim 1 wherein the counterweight is adjustable along the length of a portion of the cantilever arm to adjust the force with which the marking roller will contact the food product.

3. A method of marking an impressionable food product comprising:
   a. providing a slicing guide marker having an elongate cantilever arm rotatably attached to a support shaft, the cantilever arm having a marking roller adjacent one end thereof and a counterweight slidably carried by the arm, the marking roller comprising a wheel having a plurality of teeth extending generally radially outwardly of the wheel;
   b. determining the impressionability of a first food product;
   c. adjusting the position of the counterweight along the cantilever arm to generate a force correlated to the impressionability of the first food product; and
   d. passing the first food product adjacent the slicing guide marker and contacting the food with the marking roller to mark the first food product with a plurality of generally evenly-spaced hash marks of predetermined depth to serve as guides for slicing the first food product.

4. The method of claim 3 further comprising the steps of determining the impressionability of a second food product, the second food product having an impressionability different from that of the first food product; adjusting the position of the counterweight along the cantilever arm to generate a force correlated to the impressionability of the second food product; and passing the second food product adjacent the slicing guide marker and contacting the second food product with the marking roller to mark the second food product with a plurality of generally evenly-spaced hash marks to serve as guides for slicing the second food product.

5. The method of claim 3 wherein the counterweight is adjusted by sliding the counterweight along the cantilever arm to adjust the distance between the counterweight and the support shaft.

* * * * *